United States Patent

[11] 3,626,812

[72] Inventor Robert E. Trick
Racine, Wis.
[21] Appl. No. 53,337
[22] Filed July 9, 1970
[45] Patented Dec. 14, 1971
[73] Assignee Bucyrus-Erie Company
South Milwaukee, Wis.

[54] CYLINDER-CUSHIONING ARRANGEMENT
4 Claims, 3 Drawing Figs.
[52] U.S. Cl..................................................... 92/85,
91/408, 137/324
[51] Int. Cl....................................................... F01b 11/02
[50] Field of Search............................................ 92/85, 84;
91/408, 409; 137/513.5, 324

[56] References Cited
UNITED STATES PATENTS

| | | | |
|---|---|---|---|
| 1,523,572 | 1/1925 | Agard............................ | 92/182 |
| 1,528,817 | 3/1925 | Dinnes........................... | 92/182 |
| 1,710,011 | 4/1929 | Burnett.......................... | 92/182 |
| 3,224,378 | 12/1965 | Graham......................... | 417/511 |
| 3,340,966 | 9/1967 | Rumsey.......................... | 188/96 |
| 3,352,386 | 11/1967 | Martin............................ | 188/100 |
| 3,388,634 | 6/1968 | Maoland........................ | 92/85 |
| 3,364,675 | 1/1968 | Dorer.............................. | 92/85 X |
| 3,323,422 | 6/1967 | Freese............................ | 91/409 X |

Primary Examiner—Edgar W. Geoghegan
Assistant Examiner—Leslie J. Payne
Attorneys—Allan W. Leiser, Arthur H. Seidel and Ray G. Olander ABSTRACT: The piston of a hydraulic cylinder is provided with a cushioning groove which is between the closed end of the cylinder and a fluid port when the piston nears the end of its stroke. A relatively small damping passage in the piston communicates between one side of the groove and the fluid port, and a relatively large flow passage in the piston communicates between the opposite side of the groove and the closed end of the cylinder. A damping ring is axially movable in the groove in response to fluid pressure, and when the piston nears the closed end, the ring moves to a damping position in which it partially blocks the damping passage to impede exhaust fluid flow through the port and provide a cushioning effect on the piston. When pressurized fluid is introduced through the port in a return action, however, the ring moves away from the damping passage to allow relatively unrestricted fluid flow.

Patented Dec. 14, 1971

3,626,812

INVENTOR
ROBERT E. TRICK

BY Allan W. Leiser

ATTORNEY

CYLINDER-CUSHIONING ARRANGEMENT

BACKGROUND OF THE INVENTION

It is important in hydraulic cylinders, particularly large cylinders used for heavy equipment, to provide some means for cushioning the piston as it nears the closed end of the cylinder. Absent such an arrangement, there are likely to be severe mechanical shocks which can cause excessive wear, vibration, or damage to the cylinder or the machinery with which it is associated. While various cushioning arrangements have been proposed in the past, these have usually involved the use of separate relief-type valves which are relatively complex and expensive. Further, the necessity of providing such valves can significantly increase the overall size of the cylinder and associated machinery.

SUMMARY OF THE INVENTION

This invention contemplates a cushioning arrangement which utilizes a damping ring that is axially movable in a groove formed on the piston head. The damping ring moves, in response to fluid pressure, between a damping position in which it restricts exhaust fluid flowing out a fluid port in the cylinder to provide a cushioning effect for the piston, and an open position in which it allows free passage of fluid into the cylinder. It is the general object of the invention to provide a cushioning arrangement of this type which is extremely effective and durable while being compact, relatively inexpensive and easy to manufacture and assemble. Further specific objects and advantages will appear from the description to follow.

DESCRIPTION OF THE PREFERRED EMBODIMENT

Figure 1:
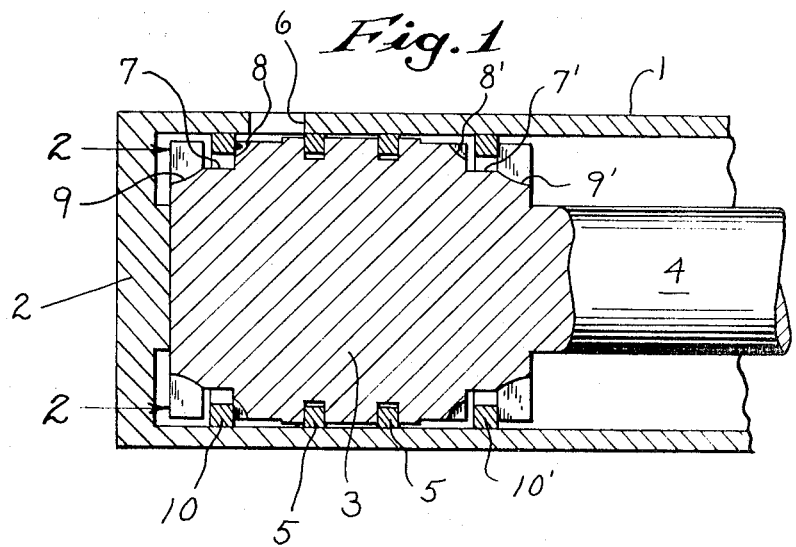
FIG. 1 is a partial view in cross section of a hydraulic cylinder incorporating a cushioning arrangement constituting a preferred embodiment of this invention.

The hydraulic cylinder in the drawing includes a conventional cylindrical casing 1 which has a closed end wall 2. A piston 3 is reciprocally movable in the casing 1 toward and away from the end wall 2, and a rod 4 extends from the piston through the opposite end of the cylinder casing 1. Because the construction of such cylinders is well known to those skilled in the art, neither the opposite end of the cylinder casing 1 nor the far end of the rod 4 have been shown in the drawing for purposes of simplicity. Also, the preferred embodiment of the invention is shown incorporated in a single-rod piston so that the end wall 2 is fully closed. It will be appreciated by those skilled in the art however, that a double-rod piston might be used and a second rod would extend from the left of the piston through the end wall 2. In this case the wall 2 would still be closed in the sense that it would define the end of the cylinder chamber to the left of the piston 3 in FIG. 1.

The piston 3 is provided with two conventional axially spaced piston rings 5 which are in sealing engagement with the interior of the cylinder casing 1 and the piston 3 to prevent substantial fluid flow between the chambers at either end of the piston 3. A port 6 extends through the side of the cylinder casing 1 at a point spaced from the end wall 2 and is suitably connected to a fluid supply system (not shown). As the piston 3 moves to the left, fluid in the chamber behind, or to the left of it, will be exhausted through the port 6, and when the piston 3 is moved to the right, pressurized fluid is introduced through the port 6 into the same chamber to the left of the piston 3.

A special cushioning groove 7 is cut around the circumference of the piston 3 near its left-hand end, and as can be seen in FIG. 1, when the piston 3 is at or near the end of its travel toward the end wall 2, the groove 7 in the piston 3 is situated (axially) between the port 6 and the end wall 2.

Figure 2:
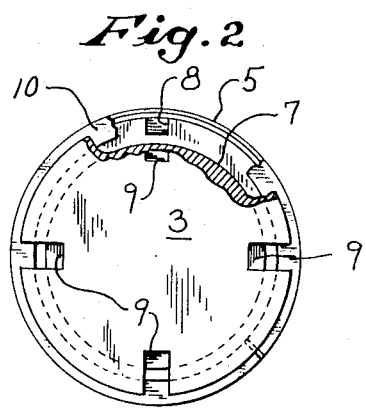
FIG. 2 is a view in cross section, partially broken away, through the plane 2—2 shown in FIG. 1.

A set of four damping passages 8 are cut in the piston 3 which extend axially to the right from the portside of the groove 7. The passages 8 are spaced in quadrature about the circumference of the piston 3 and open on its surface near the port 6 to allow fluid flow between the groove 7 and port 6 when the piston 3 is against or near the end wall 2. As can be seen most clearly in FIG. 2, the four passages 8 intersect with the sidewall of the groove 7 nearest the port 6 to define generally rectangular openings therein, each of which openings extends from the surface of the piston 3 to a point spaced from the bottom surface of the groove 7.

Additionally, a set of four flow passages 9 are cut in the piston 3 and extend axially from the opposite sidewall of the groove 7 to the cylinder chamber behind, or to the left of the piston 3. The flow passages 9 intersect with the groove 7 to define openings in the groove side opposite the port 6. Each of these openings is generally rectangular and extends from the surface of the piston 3 to the bottom of the groove 7 so that they are larger in cross section than the openings formed by the intersecting damping passages 8.

The flow passages 9 are also spaced in quadrature about the circumference of the piston 3 and are positioned in alignment with the damping passages 8. It will be appreciated that both sets of passages 8 and 9 can be formed by a series of chamfered or oblique cuts in the piston surface which is both an easy and an inexpensive machining operation.

Figure 3:
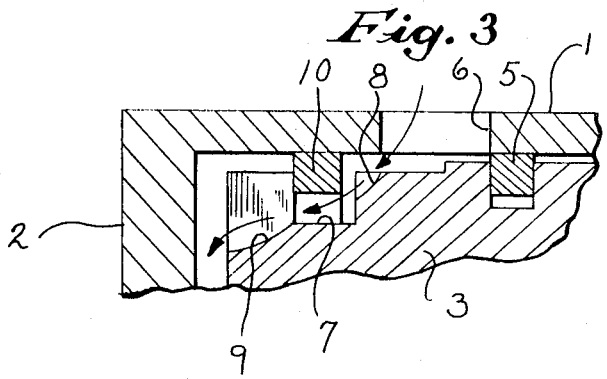
FIG. 3 is a fragmentary enlarged view in cross section specifically illustrating the cushioning arrangement of FIG. 1 in an alternate position.

A damping ring 10 is disposed in the groove 7. Like the piston rings 5, the outer radial edge of the damping ring 10 is in the sealing engagement with the wall of the cylinder casing 1 to prevent the flow of fluid. The axial width of the damping ring 10, however, is substantially less than the axial width of the cushioning groove 7, thus allowing axial movement of the ring 10 within the groove 7 in response to fluid pressure changes. The inner radial edge of the ring 10, is also spaced from the bottom of the groove 7. The ring 10 is axially movable to a damping position as shown in FIG. 1 in which it is against the right side of the groove 7. In this position, the ring 10 partially blocks the damping passages 8, leaving only a restricted orifice for the flow of fluid. The ring 10 is also movably axially to the left against the opposite wall of the cushioning groove 7 as shown in FIG. 3. In this position, called herein the flow position, the cushioning ring 10 partially block the flow passages 9. However, because the passages 9 are large, the remaining opening is as large as the unblocked openings of the damping passages.

During operation, the piston 3 moves to the left toward the position shown in FIG. 1, and the damping ring 10 automatically moves to the damping position shown therein. Once the ring 10 passes over the port 6, the only outlet for fluid escaping from the cylinder chamber to the left of the piston 3 is provided by the partially blocked damping passages 8. These restricted passages impede fluid flow and provide a cushioning effect which smoothly slows the piston 3 to minimize the shock when it engages the end wall 2. In the return stroke, when fluid is introduced under pressure through the port 6, the cushioning ring 10 is shifted to the flow position shown in FIG. 3. In this position the flow of fluid through the damping and flow passages is unimpeded by the damping ring 10 and a quick return stroke results.

In the embodiment shown, there is a duplicate cushioning arrangement on the opposite end of the piston 3 which provides cushioning for the piston 3 as it nears the other end of the cylinder casing 1 (not shown). This arrangement includes a corresponding cushioning groove 7', four damping passages 8', four flow passages 9', and a damping ring 10'. It will be appreciated that there is another port like the port 6 near the right-hand end of the cylinder casing 1, and that the cushioning arrangement will function in the same manner as described above to provide a cushioning effect as the piston 3 nears the end of its stroke to the right.

The cushioning arrangement shown is highly effective, and yet it requires only elementary machining operations and one additional element, the damping ring 10. This is far superior to earlier cushioning arrangements which require special metering valves or the like. Although a preferred embodiment of the invention has been shown and described, it will be apparent that modifications might be made without departure from the spirit of the invention. As previously indicated, for example, the invention is applicable to either single- or double-rod pistons, and the cushioning arrangement can be provided on one or both ends of the piston to provide cushioning in one or both directions. While the particular configuration of the grooves 8 and 9 is especially suitable from a machining standpoint, other configurations are possible. In view of the possible modifications, the invention is not intended to be limited by the showing herein or in any other manner except insofar as may specifically be required.

I claim:

1. A cushioning arrangement for a hydraulic cylinder or the like including a cylinder with an end wall and a piston retractable axially toward and extendable axially away from the end wall, said cushioning arrangement comprising: a fluid port through the cylinder at a point axially spaced from the end wall; a cushioning groove in the piston that is between the port and the end wall when the piston nears the end wall; a damping passage leading from the portside of the cushioning groove to the piston surface, through which fluid can flow between the cushioning groove and the fluid port when the piston is near the end wall; a flow passage leading from the opposite side of the cushioning groove to a surface of the piston, through which fluid can flow between the cushioning groove and the chamber between the piston and the cylinder end wall; and an axially movable damping ring in the cushioning groove that has an outer radial edge in sealing engagement with the cylinder and that is adapted to allow fluid to flow across the groove in either direction between the damping and flow passages regardless of its axial position, said damping ring being axially movable within the cushioning groove between a damping position in which it partially blocks the damping passage to restrict fluid flowing from said chamber to the port and an open position in which it is removed from blocking the damping passage to allow unrestricted fluid flow therethrough; the flow passage being adapted, regardless of the position of the damping ring, to allow fluid to flow therethrough at a rate substantially greater than the rate of flow through the damping passage when the damping ring is in damping position.

2. The arrangement of claim 1 wherein the damping and flow passages comprise aligned cuts transverse to the groove which together extend generally obliquely from the outer surface of the piston on the portside of the groove to the end surface of the piston.

3. The arrangement of claim 2 wherein the cushioning groove has straight sidewalls, and the intersection of the damping passage with the cushioning groove forms an opening in the port sidewall of the cushioning groove which extends from the piston surface to a point spaced from the bottom of the cushioning groove, and the intersection of the flow passage with the cushioning groove forms an opening in the opposite side of the cushioning groove which extends inwardly from the piston surface further than the clamping passage opening.

4. The arrangement of claim 2 wherein there are a plurality of aligned damping and flow passages spaced about the circumference of the piston.

* * * * *